United States Patent
Kanzaki

Patent Number: 6,045,138
Date of Patent: Apr. 4, 2000

[54] SEALING DEVICE FOR RECIPROCAL MOVEMENT

[75] Inventor: Yoshiyuki Kanzaki, Fukushima, Japan

[73] Assignee: NOK Corporation, Fujisawa, Japan

[21] Appl. No.: 08/981,009

[22] PCT Filed: Apr. 24, 1996

[86] PCT No.: PCT/JP96/01113

§ 371 Date: Mar. 6, 1998

§ 102(e) Date: Mar. 6, 1998

[51] Int. Cl.[7] .................................................. F16J 15/32
[52] U.S. Cl. .......................................... 277/562; 277/560
[58] Field of Search ...................................... 277/560, 562

[56] References Cited

U.S. PATENT DOCUMENTS

| | | | |
|---|---|---|---|
| 4,695,061 | 9/1987 | Meisner et al. | 277/27 |
| 4,827,834 | 5/1989 | Leigh-Monstevens | 92/108 |
| 4,886,281 | 12/1989 | Ehrmann et al. | 277/47 |
| 5,082,295 | 1/1992 | Wetzel | 277/562 X |
| 5,507,505 | 4/1996 | von-Arndt et al. | 277/208 |
| 5,544,895 | 8/1996 | Heine et al. | 277/9.5 |
| 5,649,709 | 7/1997 | Munekata et al. | 277/560 |
| 5,860,656 | 1/1999 | Obata et al. | 277/562 X |

*Primary Examiner*—Anthony Knight
*Assistant Examiner*—Karlena D. Schwing
*Attorney, Agent, or Firm*—Armstrong, Westerman, Hattori, McLeland and Naughton

[57] ABSTRACT

A sealing device for application to relatively movable concentric members at an interface between liquid and air contains a seal lip having a pair of annular projections on the surface thereof on predetermined axial spacing. Free ends of the projections on the device having convergent surfaces wherein, on the liquid end of the device, the angularity of the surface facing the intermediate space is no less than that of the liquid-facing surface and, on the air end of the device, the angularity of the surface facing the intermediate space is greater than that of the air-facing surface.

11 Claims, 9 Drawing Sheets

SAMPLE A

SAMPLE B

OIL SIDE ($\alpha 1 \geqq \beta 1$
$\alpha 2 < \beta 2$)

SAMPLE C

SAMPLE D

OIL SIDE ($\beta 2 > \beta 1 > \alpha 1$
$\beta 2 > \alpha 2$)

($\alpha 1 < \beta 1$)

($\alpha 2 < \beta 2$)

SEALING DEVICE FOR RECIPROCAL MOVEMENT

TECHNICAL FIELD

The present invention relates to a sealing device for reciprocal movement and, more particularly, to a sealing device provided with a seal lip having a sliding surface on which a plurality of projections are formed.

BACKGROUND ART

As a conventional sealing device for reciprocal movement of the type described above, there is known a sealing device shown, for example, in FIG. 9(a). That is, the shown sealing device is adapted to seal a space between a housing 100 and a shaft 101, which are relatively reciprocally movable in the axial direction thereof, the known sealing device is provided with an annular sealing device body 103 secured to an inner periphery of a shaft bore 102 of the housing 100 and a seal lip integrally provided on the sealing device body 103.

The seal lip 104 has a lip sliding surface to which a second stage projection 106 is formed mainly for the purpose of stabilizing a contacting condition of a first stage projection 105 due to a pressure variation, or the like. Contact angles α1 and α2 between the projections 105, 106 and the shaft 101 on atmosphere or air side and contact angles β1 and β2 therebetween on the oil or liquid side are set to β2>β2 and β1≧β2>α1 to improve the sealing performance.

However, in the known art described above, since the first stage projection scrapes off oil a, a lubrication shortage is caused with respect to the second stage projection 106, or succeeding stage projections, thus increasing the friction force and providing a problem.

Furthermore, when the sealing pressure increases, since the seal lip 104 is pressed against the shaft, a tension force increases and the friction force is accordingly increased, thus compounding the problem.

Furthermore, as shown in FIG. 9(c), there is known a sealing device provided with a seal lip 107 having a lip sliding surface containing a plurality of fine projection sets 108 for reducing the friction.

However, even in the seal lip 107 having such conventional structure of the multi-stage fine projection sets, as shown in FIG. 9(e), it has only been expected to attain a lubricating effect based on the fact that oil is maintained only between the fine projections 109 having the same shapes and positive oil introduction and its effect has not been considered. Contact angles α and β on the oil-facing side and the atmosphere-facing side of each fine projection 109 are set to α=β, or, as in the conventional example mentioned above, to β2≈β1≧α2, and in a case where the oil is not introduced between the fine projections 109, the essential friction reducing effect is not achieved because of less lubrication.

Further, as shown in FIG. 9(f), the maximum contact pressure at the front end of the fine projection 109 (a in the figure) is considerably large in comparison with a case of no projection (b in the figure), so that abrasion will progress under a use condition having a thin oil film.

Furthermore, when the sealing pressure increases and the pressing force of the seal lip 107 increases, the oil film becomes thin in an amount corresponding to the increasing of the pressing force and, accordingly, the oil introduction between the fine projections 109 is hindered, resulting in further increasing of the friction force.

The present invention was conceived to solve the above problems and its object is to provide a sealing device for accommodating reciprocal motion between two members and being capable of reducing the resultant friction force of the seal lip and improving anti-abrasion performance.

SUMMARY OF THE INVENTION

According to the present invention, there is provided a reciprocating sealing device for effecting a sealing between two members relatively movable in an axial direction with respect to each other, which sealing device is provided with an annular sealing device body fixed to one of the two members and a seal lip extending from the sealing device body toward the other one of the two members and slidably contacting the other member, characterized in that a pair of annular projections are formed on the sealing device providing a space between each other in the axial direction, wherein a surface of the seal lip contacts the other member so that free ends of the projections contact slidably a sliding surface of the other member thereby forming an annular space defined between the projections and the sliding surface of the other member, in that a seal structure is formed such that a contact structure formed on the projection disposed on the end of the sealing device opposite the liquid side with respect to the sliding surface of the other member is made so as to satisfy β2>α2 in a case where a contact angle of the projection on the liquid facing side is set to β2 and a contact angle of the projection on the side opposite that facing the liquid side is set to β2, and in that a contact structure formed on the projection disposed on the end of sealing device at the liquid side with respect to the sliding surface of the other member is made such that, when the other member is moved from the liquid side to the side opposite the liquid side, a film thickness of a liquid film formed between the projection on the liquid side and the sliding surface of the other member is made larger than a film thickness of a liquid film formed between the projection on the side opposite the liquid side and the sliding surface of the other member.

In this invention, the sealing of the liquid is carried out mainly by the projection on the sealing device opposite the liquid; namely the air side, and the projection on the liquid side acts the positively introduce the liquid, such as oil to be sealed between the projections, thereby eliminating insufficiency in amount of the liquid and hence improving the lubrication performance of the paired projections, thus reducing the friction.

For example, the contact structure of the projection on the liquid side of the device is set to satisfy β1≦α1 in a case where a contact angle of the surface of the projection on the liquid-facing side is set to β1 and a contact angle of the surface of the projection on the oppositely-facing side is set to β1.

That is, when the other or movable member moves relatively toward the air side with respect to the seal lip, since the contact angle of the projection on the liquid side is set to β1≦α1, the liquid flows into the space between the projections with a thickened liquid film at the contact surface of the projection. On the other hand, since the contact angle of the projection on the air side of the sealing device is set to β2>α2, the liquid flowed into the space between the projections flows therefrom is an extremely thin liquid film state (or does not flow therefrom with a thickened liquid film). Furthermore, when the other member moves relatively toward the liquid side with respect to the seal lip, the flow-out of the liquid from the intermediate the projections space to the liquid side as a liquid having a thickened fluid film is prevented, with the projection on the liquid side, and as the reciprocating motion progresses, the liquid flows and is accumulated into the intermediate space between the projections and filling it, thus increasing the pressure in that portion.

The pressure accumulated in the intermediate space between the projections acts in a direction counter to a force constituting the friction force, such as sealing pressure and tension force, to thereby reduce the friction force. That is, the friction reducing effect becomes larger than that before the increasing of the sealing pressure automatically. This is because, as the sealing pressure increases, the contact surface pressures of the respective projections increase and the limit pressure to be accumulated increases.

Furthermore, as a further effect of the present invention, by setting the contact angle $\beta 1$ of the projection on the liquid fluid side to a small value, when the other member moves relatively toward the opposite side with respect to the seal lip, the liquid film formed on the projection on the liquid side is thickened in comparison with that formed on the other projection and the lubrication performance is hence improved and the friction is reduced. On the other hand, with respect to the projection on the opposite side of the sealing device, the lubrication performance is improved and the friction is reduced by the liquid introduced between the projections. On the contrary, when the other member moves relatively toward the liquid sealing objective fluid side, according to the improvement of the lubrication performance due to the oil introduced between the projections, the friction produce by the projection on the liquid side can be reduced.

Furthermore, the contact structure of the projection on the liquid side with respect to the sliding surface of the other member is set to satisfy $\beta 2 > \beta 1 > \alpha 1$ in a case where a contact angle of the projection facing the liquid side is set to $\beta 1$ and a contact angle of the projection facing the opposite side is set to $\alpha 1$.

That is, when the other member moves relatively toward the side opposite the liquid side with respect to the seal lip, since the contact angle $\beta 1$ on the liquid-facing side of the projection disposed on the liquid side of the sealing device is set to be smaller than the contact angle $\beta 2$ on liquid-facing side of the projection disposed on the i.e. $\beta 1 < \beta 2$, the liquid film formed on the projection on the liquid side is made larger than that formed on the projection on the opposed or air side, and the liquid of an amount corresponding to the difference between the liquid film thicknesses on both projections flows into the space between the projections. In comparison with a conventional device, the fluid flowing into the space between the projections improves the lubrication performance on the surface on the projection of the liquid side of the sealing device facing opposite to the liquid side and on the liquid side of the other projection.

On the other hand, since the contact angles of the projection on the side of the sealing device opposite the liquid side (the air side) are set to $\beta 2 > \alpha 2$, the liquid flowed into the space flows out therefrom with an extremely thin film state (or does not flow out with a thickened film state).

That is, as a further effect, by setting the contact angle $\beta 1$ of the projection surface facing the liquid side of the sealing device to a small value, when the other member moves relatively toward the air side with respect to the seal lip, the fluid film formed on the projection on the liquid side is made thickened in comparison with that formed on the projection on the opposite side and the lubrication performance is hence improved and the friction is reduced, and, on the other hand, with respect to the projection on the air side of the sealing device, the lubrication performance is improved and the friction is reduced by the liquid introduced between the projections. On the contrary, when the other member moves relatively toward the liquid side of the sealing device, according to the improvement of the lubrication performance due to the oil introduced between the projections, the friction of the projection on the liquid side can be reduced.

Furthermore, this invention contemplates providing a plurality of paired projections in the axial direction.

The plurality of paired projections are lubricated by the formation of the liquid films through the relative reciprocating motion of the other member. When the other member moves relatively toward the air side of the sealing device, the liquid film formed on the surface of each respective paired of the projections on the facing opposite to the fluid side is made thin in comparison with the liquid film formed on the surfaces of each of the respective paired projections facing the liquid side. That is, the liquid film is scraped off by the projection on the side opposite the liquid side, i.e. the air side and the sealing liquid flows into the space between the respective pair of projections and is accumulated therein. As mentioned above, since there is adopted a structure capable of positively accumulating the liquid between one set of two stage projections, the projections of the respective pairs are surely contacted by the liqiud, thus providing good lubrication performance and less friction and abrasion.

It is preferable that each projection has a minimum height of about 1 $\mu$m.

Particularly, by providing the pressure accumulation function between the respective paired projections as mentioned above, the liquid films caused by the reciprocating motion are positively accumulated between the respective paired projections and the pressure therebetween hence increases. The increasing speed of the pressure generated between the respective paired projections is remarkably related to the volume of the space which is formed between the projections. By constructing the projections as fine ones, the volume of the space is extremely reduced, and accordingly, even if the amount of the liquid flowing in the space is small, such as one forming a liquid film, the liquid such as oil rapidly fills the space, thus instantaneously achieving a pressure accumulation in the space. That is, the effect caused by forming the fine projections can be effectively utilized.

By forming the fine projections as structural elements, an area actually contacting the surface of the movable other member can be reduced. In the case of the same shapes of the seal lips and of the springs applying the tension forces, the same tension forces are applied. However, in the case of the reduced contacting area, the free ends of the fine projections strongly contact locally, so that the maximum contacting pressure of each projection becomes considerably large in comparison with the case of no fine projection. For this reason, the limit value of the pressure to be accumulated is increased and the friction reducing effect can be accordingly amplified.

Furthermore, as a method for positively introducing the liquid between a pair of the projections and improving the lubrication performance of both the projections, it is effective to form the free end of one projection so as to provide a round shape and providing the contact angles of the projection on the liquid side set to satisfy $\beta 2 > \beta 1 > \alpha 1$.

That is, by forming the axial sectional shape of the projection on the liquid side of the sealing device to provide an arcuate shape in section, when the movable object member relatively moves toward the side opposite the liquid side of the sealing device, the thickness of the liquid film on the projection surface on the liquid side becomes thicker than that of the projection surface on the opposite opposed sealing side because of the roundness of the free end of the projection to thereby accumulate the liquid in the space between the projections. Thus, the lubrication performance of both the projections can be improved and the friction force is reduced.

Still furthermore, as a method for positively introducing the liquid between a pair of the projections and improving the lubrication performance of both the projections, it is effective that a fine projection set constituting a plurality of fine projections is formed on a surface on the projection of the liquid side contacting the sliding surface of the movable other member, and in a case where a contact angle of each of the fine projections of the fine projection set on the liquid side is set to $\beta 3$ and a contact angle thereof on the opposite side is set to $\alpha 3$, a relationship between the contact angles is set to $\beta 3 < \alpha 3$.

According to such structure, by the specific contact angles of the fine projection set formed on the contact surface of the projection on the liquid side to the sliding surface of the movable other member, the fluid, such as oil, to be sealed is positively introduced into the space between the projections, and by solving an problem of the insufficient fluid amount, the lubrication performance of the paired projections can be improved and the friction is hence reduced. The sealing of the liquid is performed mainly by the projections on the or the side opposite the liquid side.

When the other member relatively moves toward the air side with respect to the seal lip, with the projection on the liquid side, since the contact angle $\beta 3$ of each of the fine projections on the liquid side is made smaller than the contact angle $\alpha 3$ of the projection on the opposite side, i.e. $\beta 3 < \alpha 3$, a thickened fluid film is formed.

On the other hand, with the projection on the air side, since the contact angle $\beta 2$ of the projection on the liquid side is made larger than the contact angle $\alpha 2$ of the projection on the air side, i.e. $\beta 2 > \alpha 2$, a thin liquid film is formed, and the liquid hardly leaks on the air side, thus achieving the sealing performance. That is, liquid of the amount corresponding to the thickness of the liquid film is accumulated in the space between the projections.

On the contrary, when the movable other member relatively moves toward the liquid side with respect to the seal lip, with respect to the projection on the liquid side, since the contact angles $\alpha 3$ and $\beta 3$ of each fine projection formed on the surface contacting the movable member are set to $\beta 3 < \alpha 3$, the liquid accumulated in the space between the projections merely forms a thin liquid film, and hence, only a small amount of the liquid returns to the sealing liquid side of the sealing device.

That is, according to the repeated reciprocating motions, the liquid can be surely accumulated in the space intermediate the projections.

The liquid flowed and accumulated in this space can improve, in comparison with the conventional device, the lubrication performances on the opposed intermediate (space side-facing) of the projection on the liquid side and on the intermediate (space side-facing) of the projection of the air side of the sealing device.

That is, by setting the contact angles of the contact surface of the fine projections on the projection on the liquid side with respect to the sliding surface of the movable object member to $\beta 3 < \alpha 3$, when the object member moves relatively toward the air side with respect to the seal lip, the liquid film formed on the fine projections on the sealing liquid side is thickened and the lubrication performance of the projection on the air side can be improved by the sufficient amount of liquid being accumulated in the space between the projections, whereby the friction force can be reduced.

On the contrary, when the object member relatively moves toward the sealing objective fluid side with respect to the seal lip, the friction force of the fine projection set on the projection on the liquid side can be reduced by the improvement of the lubrication performance due to the sufficient amount of the liquid being flowed and accumulated in the space intermediate the projections.

In order to achieve such effects of the contact angles, it is preferred to form the projections each having a height of about 1 $\mu$m.

The fine projection set formed on the projection on the liquid side of the sealing device is formed on the surface contacting the sliding surface of the other member and providing that the contact angle of the liquid-facing side of the projection is set to $\beta 1$ and the contact angle thereof is set to $\alpha 1$ on the opposite side, when the relation therebetween is set to $\beta 1 > \alpha 1$, the fine projection set is formed on the liquid-facing surface of the projection on the air side of the sealing device, and when the relation therebetween is set to $\beta 1 \leq \alpha 1$, the fine projection set is formed on the surface of the projection of the sealing device liquid side of the sealing device.

The relationship in largeness between these contact angles $\beta 1$ and $\alpha 1$ has no relation to the function of the fine projection set, and in both the cases, the effect of the liquid accumulation into the intermediate space can be obtained by the fine projection set. Furthermore, in the case of $\beta 1 \leq \alpha 1$ or $\beta 2 > \beta 1 > \alpha 1$, the pressure accumulation in the space can be effectively increased.

BRIEF DESCRIPTION OF THE DRAWINGS

FIG. 1 represents a sealing device for reciprocal motion according to a first embodiment of the present invention, in which

FIG. 3 represents a sealing device for reciprocal motion according to a second embodiment of the present invention, in which

FIG. 4 represents a sealing device for reciprocal motion according to a third embodiment of the present invention, in which

FIG. 6 represents a sealing device for reciprocal motion according to a fourth embodiment of the present invention, in which

FIG. 7 represents a sealing device for reciprocal motion according to a fifth embodiment of the present invention, in which

FIG. 8 represents a sealing device for reciprocal motion according to a sixth embodiment of the present invention, in which

FIG. 9 represents conventional forms of sealing devices in which FIG. 9(a) is a sectional view of an essential portion of one of which.

BEST MODE FOR EMBODYING THE INVENTION

Figure 1A:
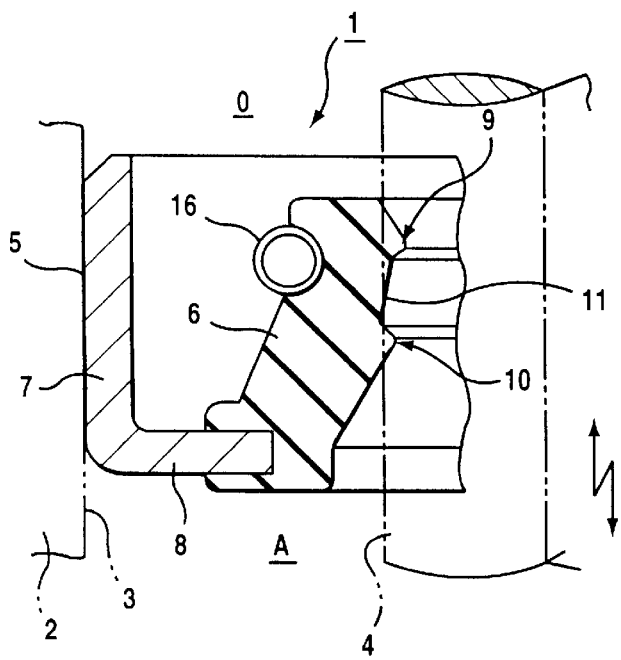
FIG. 1(a) is a sectional view of an essential portion thereof.

The present invention will be described hereunder with reference to the embodiments.

Further, it is to be noted that, in the following description, the liquid is oil and "sealing objective fluid side" is mentioned as "oil side", "opposed sealing objective fluid side" is mentioned as "atmosphere or air side", "oil side projection" is mentioned as "first stage projection","atmosphere side projection" is mentioned as "second stage projection", "movement of a shaft from the oil side to the atmosphere side" is mentioned as "pumping stroke" and "movement of a shaft from the atmosphere side to the oil side" is mentioned as "motoring stroke", respectively, for the sake of convenience for explanation.

(First Embodiment)

FIG. 1 shows a sealing device for reciprocal motion (called reciprocating sealing device herein) according to the first embodiment of the present invention. The reciprocating sealing device 1 is adapted to seal between two members relatively movable along an axial direction, that is, a housing 2 and a shaft 4 inserted into a shaft hole 3 of the housing 2 and is provided with a metal ring 5 as an annular sealing device body to be fixed to an inner periphery of the shaft hole 3 of the housing 2 and a seal lip 6 extending from the metal ring 5 to the shaft 4 and contacting an outer peripheral surface of the shaft 4 which is slidable.

The metal ring 5 is an annular member having a substantially L-shape section and is provided with a cylindrical outer fitting portion 7 and an inward flanged portion 8 extending radially inward from one end of the outer fitting portion 7.

The seal lip 6 is formed of a rubber-like elastic material, such as synthetic rubber, and has a tapered cylindrical shape extending approximately in parallel to the outer fitting portion 7 of the metal ring 5 in a manner that one end of a larger diameter portion is supported in a cantilever manner fixed to an inner end of the inward flanged portion 8 and a small diameter lip front end portion as a free end contacts an outer periphery of the shaft 4 in a sealed manner. A spring member 16 is mounted to a back surface of the lip front end portion.

A pair of first and second stage projections 9 and 10, separated from each other in an axial direction, are formed on a surface of the seal lip 6 contacting the shaft 4. The free ends of the first and second stage projections 9 and 10 contact slidably the surface of the shaft 4 as an object member, and a bottom space 11 is formed between the projections 9 and 10 and the outer peripheral surface of the shaft 4.

Each of the respective projections 9 and 10 has an axial cross section of substantially triangular shape such that oblique surfaces of the projections 9 and 10 from the free ends thereof toward the axial oil side O and atmosphere or air side A are gradually lowered in their heights, and the contact angles are set by angles constituted between the oblique surfaces of the projections 9 and 10 on the oil side O and the atmosphere side A and the outer periphery of the shaft 4, respectively. The bottom space 11 between the projections 9 and 10 is trapezoidal in section and defined by the oblique mutually facing surfaces of the projections 9 and 10 and a bottom surface parallel to the outer peripheral surface extending of the shaft 4.

Figure 1B:
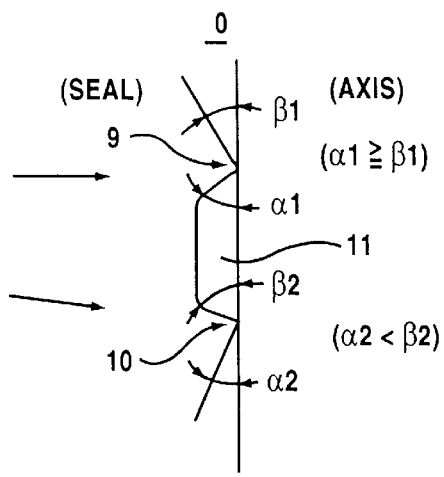
FIG. 1(b) is a view showing a contact condition of a seal lip.

In the present invention, as shown in FIG. 1(b), providing that a contact angle of the first stage projection 9 on the oil side O is made as $\beta1$ and a contact angle thereof on the atmosphere side A (bottom space 11 side) is made as $\alpha1$, the contact angle $\alpha1$ is set to be larger than the contact angle $\beta1$ ($\alpha1 \geq \beta1$), and providing that a contact angle of the second stage projection 10 on the oil side O (bottom space 11 side) is made as $\beta2$ and a contact angle thereof on the atmosphere side A is made as $\alpha2$, the contact angle $\alpha2$ is set to be smaller than the contact angle $\beta2$ ($\alpha2 < \beta2$).

In the present invention, according to the specific contact angles of the paired projections 9 and 10, oil to be sealed is positively introduced into the annular bottom space 11 between the projections 9 and 10 to thereby increase the pressure in the bottom space 11 and hence to reduce the tension force thereof. In addition, the lubricating performance of the first and second stage projections 9 and 10 can be improved by solving the insufficient oil problem, thus reducing the friction. The oil sealing function is mainly performed by the second stage projection 10. In this regard, the present invention differs from a conventional structure in which the oil seal function is mainly performed by the first stage projection.

That is, in the "pumping stroke" in which the shaft 4 slides toward the atmosphere side A, an oil film formed on the second stage projection 10 is made thinner than that formed on the first stage projection 9. That is, since the oil film is scraped off by the second stage projection 10, the oil is accumulated in the bottom space 11 formed between the projections 9 and 10. On the contrary, in the "motoring stroke" in which the shaft 4 slides toward the oil side O, the oil is also accumulated in the bottom space 11. As the oil fills the bottom space 11, the pressure P in the bottom space 11 (called pressure P between the projections, hereinafter) increases and the pressure is accumulated.

That is, in the "pumping stroke", since the contact angle of the first stage projection 9 is set to $\alpha1 \geq \beta1$, the oil flows into the bottom space 11 between the projections 9 and 10 at a portion contacting the first stage projection 9. On the other hand, since the contact angle of the second stage projection 10 is also set to $\beta2 > \alpha2$, the oil entering the bottom space 11 flows externally in an extremely thin oil film state (or does not flow externally in a thick oil film state). Further, when the shaft 4 is moved toward the oil side O with respect to the seal lip 6, with respect to the first stage projection 9, the oil in the bottom space 11 is prevented from flowing out toward the oil side O, and as the shaft 4 reciprocates, the oil flows into the bottom space 11 between the projections 9 and 10, hence increasing the pressure P between the projections.

Figure 1C:
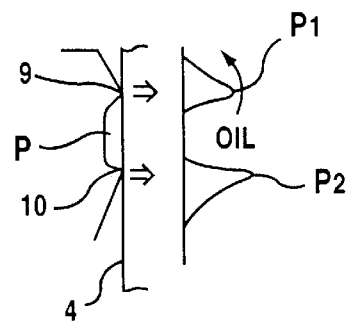
FIG. 1(c) is a view showing a pressure distribution and FIG. 1(d) is a view showing a pressure accumulation condition.
Figure 1D:
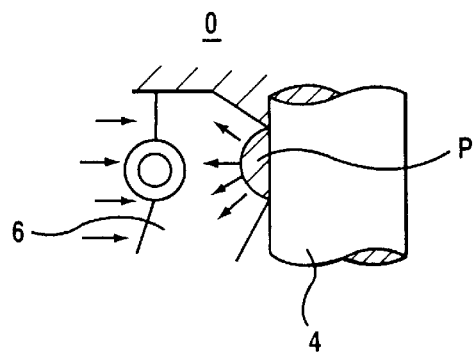

The thus accumulated oil acts in a direction to push up the seal lip 6, as shown in FIG. 1(d), to thereby reduce the tension force with respect to the shaft 4, which force is increased by the sealing pressure, that is, a vertical force W acting on the shaft 4. In a case of constant friction coefficient f, since the friction force F =f×W, the friction force F is reduced by an amount corresponding to the reduction of the vertical force W, thus achieving a desired sliding motion.

As the pressure P between the projections in the bottom space 11 tends to increase over the maximum contact pressure of the respective projections 9 and 10, the oil flows out from the space 11 in the shape of oil film, so that the pressure P has a limit pressure value which does not exceed the maximum contact pressure.

When the sealing pressure increases, the seal lip 6 is entirely pushed against the shaft 4 and the maximum contact pressures of the front ends of the first and second stage projections 9 and 10 are also increased. According to such increasing of the pressures, the limit value of the accumulated pressure in the bottom space 11 becomes large, the pressure P between the projections are increased and the force to push up the seal lip 6 is hence increased. Thus, the increasing of the friction force due to the reduction of the tension force increasing in accordance with the increasing of the sealing pressure can be suppressed, thus being effective. That is, the pressure P between the projections provided with the tension force reduction effect has a self-follow-up effect with respect to the sealing pressure.

As the pressure P between the projections approaches the maximum contact pressures of the first and second stage projections 9 and 10, the oil tending to be accumulated more than that value flows out from the bottom space 11 in the form of oil film. According to the flow-out of the oil on the atmosphere side A, the sealing performance is lowered, and in order to improve this sealing performance, it is necessary to return the oil to the oil side O.

For achieving this purpose, as shown in FIG. 1(c), when the maximum contact pressure P2 of the second stage projection 10 is made larger than that P1 of the first stage projection 9, the friction force can be reduced by controlling the pressure accumulation performance so as to return the oil to the oil side O over the peak of the lower maximum contact pressure P1 of the first stage projection 9 and, at the same time, the sealing performance can be also improved.

In the described embodiment, since the seal lip 6 has a cantilever structure, the tension forces of the first and second stage projections 9 and 10 are increased by pushing the projections in the axially central direction in accordance with the increasing of the sealing pressure. In this time, since the seal lip 6 has a thickness, a pressure acts on this thickness portion in the axial direction on the side of the atmosphere and the seal lip 6 has a compression force. However, since the seal lip 6 is pressed by a pressure from the outer peripheral side thereof, the seal lip 6 is deformed so as to be bent in the central direction of the shaft 4 and the tension force of the second stage projection 10 becomes larger than that of the first stage projection 9, thus surely achieving the sealing performance.

In order to further improve the sealing performance at the pressure accumulated time, it will be preferred to set the inner diameter of the second stage projection 10 to a value smaller than that of the first stage projection 9 in the free state thereof.

Furthermore, the following method will be preferred to control the pressure accumulation performance. That is, it is desired to set the shapes of the first stage projection which is determined by the contact angles of $\alpha 1$ and $\beta 1$ and the second stage projection 10 which is determined by the contact angles of $\alpha 2$ and $\beta 2$ to the shapes of the projections 9 and 10 asymmetrical in sections thereof with each other so as to have a relationship of the contact angles of $\beta 2 \geq \alpha 1$ with the condition of $\alpha 1 > \beta 1$ and $\alpha 2 > \beta 2$. According to the shapes of the projections 9 and 10, the oil will easily return.

According to the present invention, due to the positive pressure accumulation effect between the projections 9 and 10 of the seal lip 6, the load capacity (seal lip push-up ability) is carried, thus reducing the friction. Therefore, in the application to the seal lip 6 of the cantilever structure having good eccentric follow-up function of the present invention, the contact pressure caused at the free end portions of the projections 9 and 10 is increased in accordance with the increasing and decreasing of the sealing pressure, and since the pressure accumulation effect is followed up to this variation of the contact pressure, the stable low friction characteristic can be achieved with less affect of the pressure variation.

According to the conventional structure of the seal lip, since the first stage projection scrapes off the oil, the lubricating function of the second stage is made worse and the friction force and the abrasion are made large. According to the shape of the seal lip of the present invention, since the oil is positively supplied into the bottom space 11 between the projections 9 and 10, the lubricating function of the first and second stage projections 9 and 10 can be improved. For this reason, the friction force and abrasion of the second stage projection 10 can be reduced, thus being effective.

Experimental Example

Figure 9A:
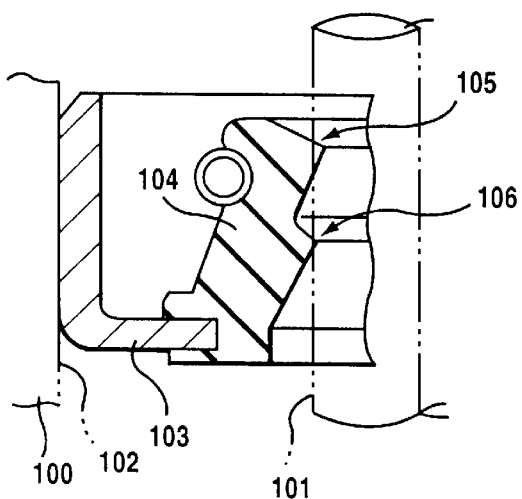
Figure 9B:
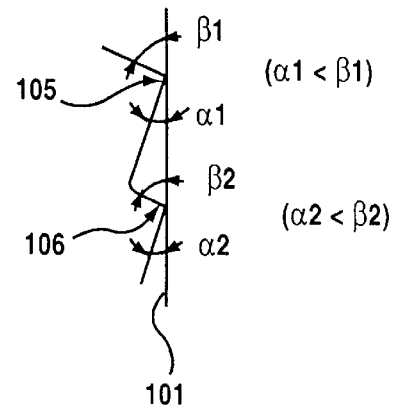
FIG. 9(b) is a view showing a contact condition of the seal lip of FIG. 9(a)

Friction forces were measured by using a sample A having a conventional shape shown in FIG. 9(a) and a sample B having a shape according to the present invention shown in FIG. 1 which were prepared so as to provide contact angles between seal lips and the shaft 4 as shown in Table 1.

TABLE 1

| Contact Angle | Sample | |
|---|---|---|
| Difference (°) | A | B |
| $\beta 1 - \alpha 1$ | 30° ($\alpha 1 < \beta 1$) | −20° ($\alpha 1 > \beta 1$) |
| $\beta 2 - \alpha 2$ | 30° ($\alpha 2 < \beta 2$) | 30° ($\alpha 2 > \beta 2$) |

The test was carried out by using a device shown in FIG. 2.

A sample S is mounted to a lower portion of a chamber 20 and an oil 21 is supplied above the sample S. The seal lip of the sample S contacts the surface of a shaft 22 with contact angles shown in Table 1. Under this contacting condition, the shaft 22 was reciprocally vibrated in a vertical direction with a sine curve wave and the friction forces at this time were measured by a force detector 23, such as a load cell.

The test was carried out under the conditions of oil kind: paraffin series mineral oil, rod stroke: 50 mm, reciprocal vibration frequency: 1.2 Hz, pressure in chamber: 0.25 MPa and temperature: 27° C.

The obtained test results are shown in Table 2 with relationship between the stroke position and the friction force. In the Table 2, there are shown the pressure P caused between the projections and the average friction force at the stroke central position obtained by FIGS. 2(b) and 2(c).

TABLE 2

| Measuring | Sample | |
| --- | --- | --- |
| Item | A | B |
| Average Friction Force (N) at Stroke Central Position | 29 (100%) | 12 (41%) |
| Pressure generated between lips (MPa) | 0 | 0.15 |

Figure 2A:
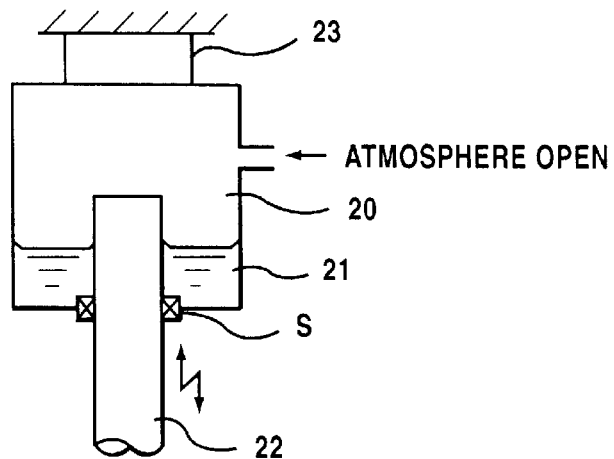
FIG. 2(a) is a view showing a test device for the sealing device of FIG. 1, and FIGS. 2(b) and 2(c) are views showing results of experimental tests.
Figure 2B:
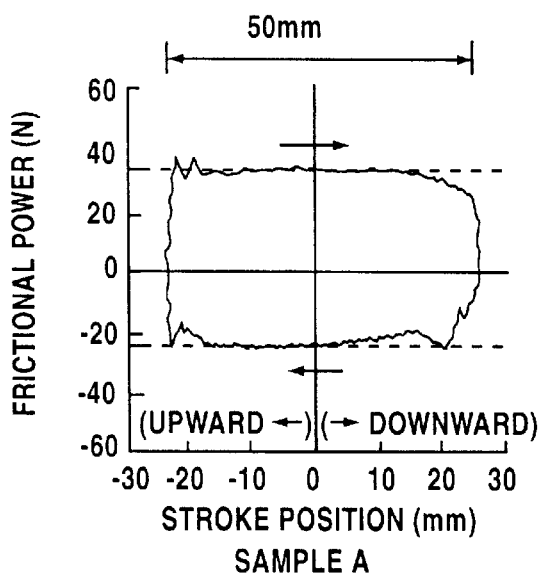
Figure 2C:
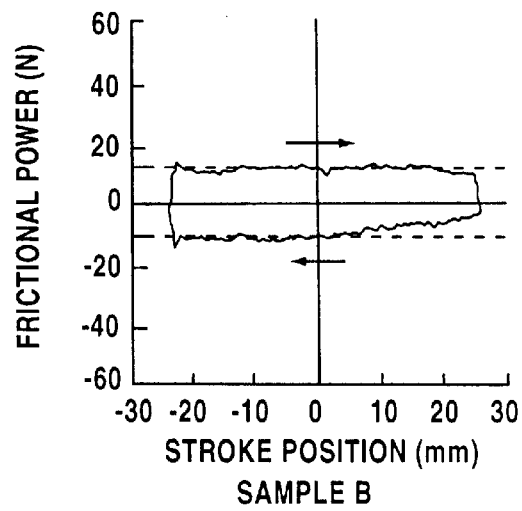

In comparison of the sample A having the conventional shape with the sample B having the shape according to the present invention, it is apparent, as shown in FIGS. 2(b) and 2(c), that the friction force was remarkably reduced with respect to the sample of the present invention, and in view of the Table 2, its one side average friction force is reduced to 41%. Furthermore, the pressure P between the projections is not caused in the conventional sample A and the pressure P of 0.15 MPa is caused only in the sample B of the present invention. Thus, it is clear that the friction force reduction effect can be achieved only by the present invention.

(Second Embodiment)

FIG. 3 represents a reciprocating sealing device according to the second embodiment of the present invention.

Figure 3A:
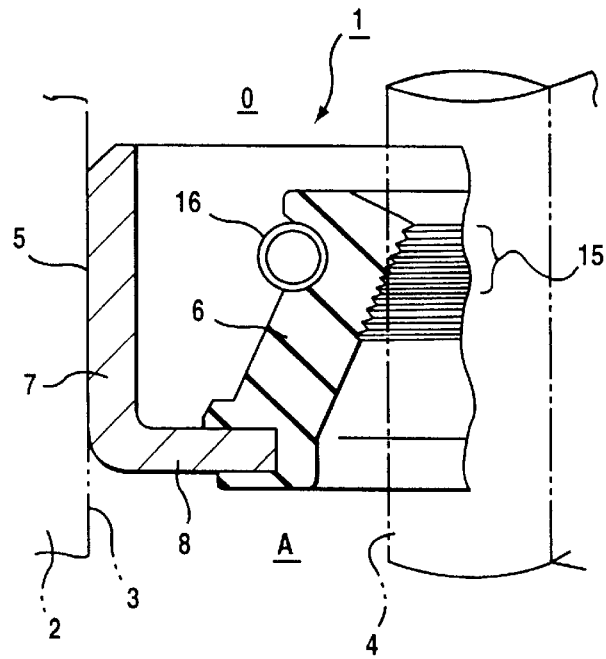
FIG. 3(a) is a sectional view of an essential portion thereof.
Figure 3B:
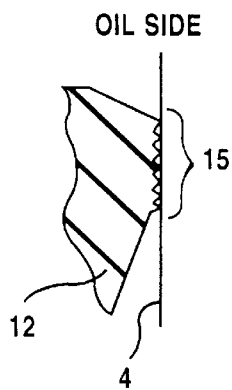
FIG. 3(b) is a view showing a contact condition of a seal lip.
Figure 3C:
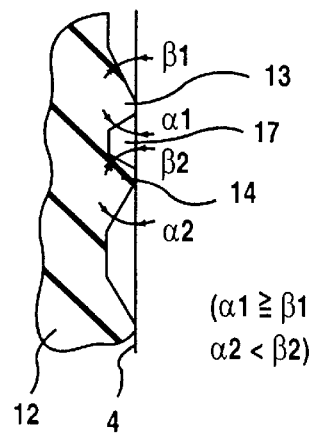
FIGS. 3(c) and 3(d) are enlarged views of the contacting portion.

In this second embodiment, in an entire contacting area between the seal lip 12 and the shaft 4, as shown in FIG. 3(c), contact angles α1 and β1 between the shaft 4 and a first stage projection 13 nearest the oil side O are set to α1≧β1 and contact angles α2 and β2 between the shaft 4 and a second stage projection 14 are set to α2<β2. These first and second stage projections 13 and 14 are formed as one set and a plurality sets 15 of these fine projections are formed, each of the projections having a height of 5–50 μm. A spring member 16 is mounted to the back surface of the fine projection sets 15. The other structures of the second embodiment are substantially the same as those of the first embodiment, so that like reference numerals are added to structural portions corresponding to those of the first embodiment and the explanations thereof are omitted herein.

In the reciprocating sealing device of the second embodiment, with the fine projection sets 15 each composed of one set of two stage fine projections with the opposed contact angles with respect to the shaft 4, the oil film formed by the first stage projection 13 is made large in the "pumping stroke", and since the oil film is scraped off by the second stage projection 14, oil is accumulated in a bottom space 17 formed between the first and second stage projections 13 and 14. As the oil fills the bottom space 17, the pressure between the projections is increased, thus pressure is accumulated. The pressure is first accumulated in the bottom space 17 between the set of two stage projections 13 and 14 positioned nearest the oil side O, and subsequently, the pressure accumulated area in the bottom space 17 is expanded toward the atmosphere side A.

Figure 9C:
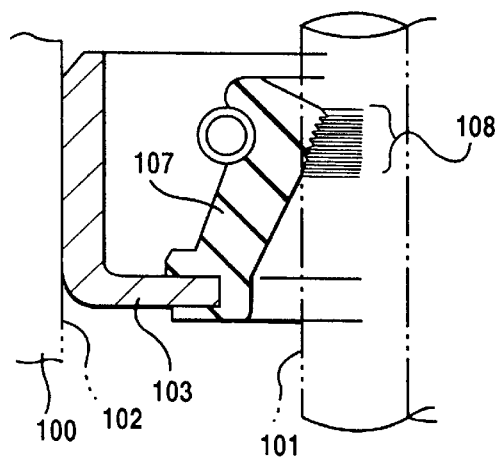
FIGS. 9(c), 9(d), 9(e) and 9(f) are views, similar to FIGS. 9(a) and 9(b), showing, in various degrees of detail, another conventional form of sealing device.
Figure 9D:
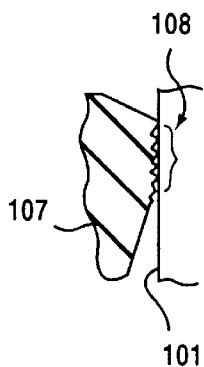
Figure 9E:
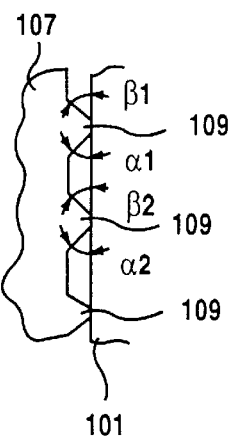
Figure 9F:
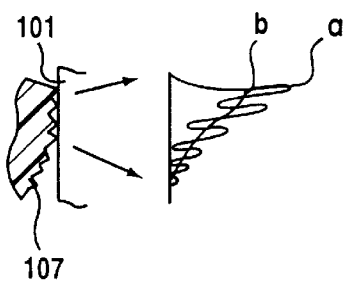

With the fine projection set of the conventional seal lip shown in FIG. 9(c), since the structure is not made so as to positively introduce the oil into a space between the projections 109, the lubrication is likely made insufficient in a contact sliding area, the friction force likely increases and the abrasion will be easily caused. Particularly, with respect to the projections in a contacting area on the atmosphere side, because the oil is obstructed by the projection near the oil side, the lubrication becomes insufficient and the abrasion will be likely caused. Further, in the case of increasing of the sealing pressure, since the oil film caused by the sliding motion is made thin, the abrasion of the projection will be accelerated.

On the other hand, with the fine projection sets 15 of the present invention, there is adopted a structure in which the oil is positively accumulated in the bottom space 17 between the projection sets each constituted by two stage projections 13 and 14. Accordingly, the first and second stage projections 13 and 14 surely contact the oil, thus improving the lubrication performance with low friction force and less abrasion.

In the application of the fine projections of the present invention, the contact area is made small by making fine the projections and the surface contact pressure is hence increased at the front ends thereof, so that the force to be accumulated is increased, further improving the reduction of the friction force. Furthermore, the volume of the space between the projections 13 and 14 in which the oil is accumulated can be made extremely small, thus quickly accumulating the pressure and hence being effective for the reduction of the friction force.

Although the height of each of the projections is preferably 5–50 μm, it is not limited to such value and may be made to about 1 μm in minimum.

Figure 3D:
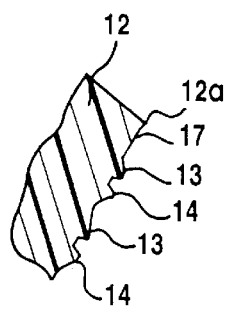

Further, in the time of forming the fine projections, it may be possible to form a predetermined flat portion 17 as shown in FIG. 3(d). This example aims to realize the pressure accumulation and improve anti-abrasion performance in response to the pressure of the seal fluid by setting a state such that, in the initial state of the seal, only the free end 12a of the seal lip 12 or the free end 12a and a few of the fine projections contact the shaft, and when a relatively high pressure is achieved, a much greater number of fine projections contact the shaft.

(Third Embodiment)

Figure 4A:
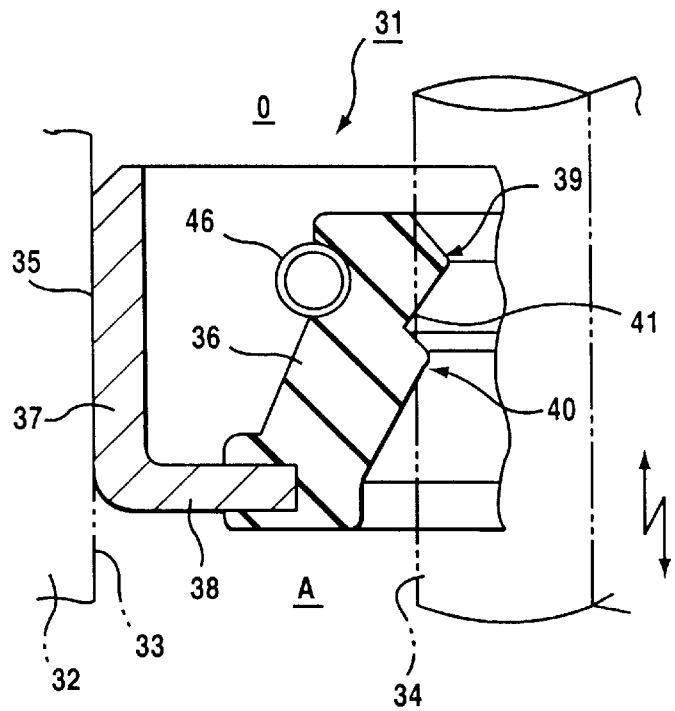
FIG. 4(a) is a sectional view of an essential portion thereof and FIG. 4(b) is a view showing a contact condition of a seal lip.

FIG. 4 represents a reciprocating sealing device according to the third embodiment of the present invention. This reciprocating sealing device 31 is adapted to seal between two members disposed relatively slidable in an axial direction, one being a housing 32 and the other being a shaft 34 inserted into a shaft hole 33 of the housing 32, and is provided with a metal ring 35 as an annular sealing device body to be fixed to the inner periphery of the shaft hole 33 and a seal lip 36 extending from the metal ring 35 toward the shaft 34 and contacting in a sealed state the outer peripheral surface thereof to be slidable.

The metal ring 35 is an annular member having substantially an L-shape in section and is provided with a cylindrical outer fitting portion 37 and an inward flanged portion 38 extending in a radial direction from one end of the outer fitting portion 37.

The seal lip 36 is formed of a rubber-like elastic material, such as synthetic rubber, and has a tapered cylindrical shape extending approximately in parallel to the outer fitting portion 37 of the metal ring 35 in a manner that one end of a larger diameter portion is supported in a cantilever manner fixed to an inner end of the inward flanged portion 38 and a small diameter lip front end portion as a free end contacts an outer periphery of the shaft 34 in a sealed manner. A spring member 46 is mounted to a back surface of the lip front end portion.

A pair of first and second stage projections 39 and 40 separated from each other in an axial direction are formed to a surface of the seal lip 36 contacting the shaft 34.

Each of the respective projections 39 and 40 has an axial cross section substantially in triangular shape having oblique surfaces of the projections 39 and 40 inclining from the front ends thereof toward the axial oil side O and atmosphere side A, and the contact angles are set by angles constituted between the oblique surfaces of the projections 39 and 40 on the oil side O and the atmosphere side A and the outer periphery of the shaft 34, respectively. These first and second stage projections 39 and 40 contact slidably the surface of the shaft 34 as an objective member and a bottom space 41 is formed between the projections 39 and 40 and the outer peripheral surface of the shaft 34 so as to provides a triangular space in section.

Figure 4B:
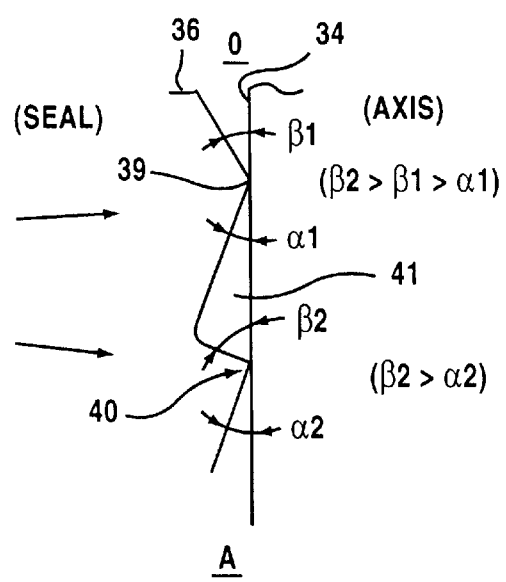

As shown in FIG. 4(b), providing that a contact angle of the second stage projection 40 on the atmosphere side A is made as $\alpha 2$ and a contact angle thereof on the oil side O is made as $\beta 2$, the contact angle $\beta 2$ is set to be larger than the contact angle $\alpha 2$ ($\alpha 2 < \beta 2$), and providing that a contact angle of the first stage projection 39 on the oil side O is made as $\beta 1$ and a contact angle thereof on the atmosphere side A (space 41 side) is made as $\alpha 1$, the angular relationship is set to be $\beta 2 > \beta 1 > \alpha 1$ ($\alpha 1 \approx \alpha 2$).

In the present invention, according to the specific contact angles of the first and second stage projections 39 and 40, an oil to be sealed is positively introduced into the bottom space 41 between the projections 39 and 40 to solve the insufficient oil problem, to improve the lubrication performance of the projections 39 and 40 and to reduce the tension force thereof. The oil sealing function is mainly performed by the second stage projection 40. In this point, the present invention differs from a conventional structure in which the oil seal function is mainly performed by the first stage projection.

That is, when the shaft 34 slides toward the atmosphere side A as a side opposite to a liquid side to be sealed, an oil film formed on the second stage projection 40 is made thinner than that formed on the first stage projection 39. That is, since the oil film is scraped off by the second stage projection 40, the oil is introduced in the bottom space 41 formed between the projections 39 and 40.

The lubrication performance on the atmosphere side A of the first stage projection 39 and on the oil side O of the second stage projection 40 can be improved and the friction can be hence reduced.

That is, by setting the contact angle $\beta 1$ of the first stage projection 39 on the oil side O to a small value, in the "motoring stroke" in which the shaft 34 slides toward the oil side O, a thick oil film is formed by the first stage projection 39 to thereby improve the lubrication performance due to the oil introduced into the bottom space 41 by the second stage projection 40 and to reduce the friction. On the contrary, in the "pumping stroke" in which the shaft 34 slides toward the oil side O, the friction of the first stage projection 39 can be reduced by the improvement of the lubrication performance due to the oil introduced into the bottom space 41.

In the seal lip having the conventional shape, because the first stage projection scrapes off the oil, the lubrication performance of the second stage projection is made worse and the friction force and the abrasion are made large. On the contrary, according to the shape of the present invention, the oil is positively supplied to the second stage projection, so that the friction force and the abrasion are reduced.

On the other hand, in the present invention, since the seal lip 36 has a cantilever structure, the tension forces of the first and second stage projections 39 and 40 are increased by being pushed in the axially central portion in accordance with the increasing of the sealing pressure. In this time, the seal lip 36 has a thickness and a pressure acts on this thickened portion in the atmosphere side axial direction to thereby apply a compression force to the seal lip 36. However, since the seal lip 36 is pressed from the outer peripheral side, the seal lip 36 deforms so as to be bent in the axial central direction of the shaft 34, and the second stage projection 40 is further pushed in the axial central direction. For this reason, the tension force of the second stage projection 40 becomes larger than that of the first stage projection 39, thus surely achieving the sealing function.

In the above-mentioned embodiment, although the contact angle is approximately set to $\alpha 1 = \alpha 2$, it may be set to $\alpha 1 > \alpha 2$. In the setting to $\alpha 1 > \alpha 2$, in the "pumping stroke" with respect to the seal lip 36, a flow rate of an oil returning to the oil side through the first stage projection 39 is reduced, and the fluid accumulation in the bottom space 41 can be further amplified.

By the oil introduced into the bottom space 41 between the projections 39 and 40, the lubrication performance on the atmosphere side A of the first stage projection 39 and on the oil side O of the second stage projection 40 is improved and the friction is reduced.

That is, by setting the contact angle $\beta 1$ of the first stage projection 39 on the oil side O to a small value, in the "motoring stroke" in which the shaft 34 slides toward the oil side O, a thick oil film is formed by the first stage projection 39 to thereby improve the lubrication performance due to the oil introduced into the bottom space 41 by the second stage projection 40 and to reduce the friction. On the contrary, in the case where the shaft 34 slides toward the oil side O, the friction of the first stage projection 39 can be reduced by the improvement of the lubrication performance due to the oil introduced into the bottom space 41.

In the seal lip having the conventional shape, because the first stage projection 39 scrapes off the oil, the lubrication performance of the second stage projection 40 is made worse and the friction force and the abrasion are made large. On the contrary, according to the shape of the present invention, the oil is positively supplied to the second stage projection.

Experimental Example

The friction forces were measured by using a sample C having a conventional shape as shown in FIG. 9(a) and a sample D having a shape according to the present invention as shown in FIG. 4 and preparing the samples so as to provide contact angles shown in a Table 993.

TABLE 3

| Contact Angle | Sample | |
|---|---|---|
| Difference (°) | C | D |
| $\beta 1 - \alpha 1$ | 40° ($\beta 2 = \beta 1 > \alpha 1$) | 10° ($\beta 2 > \beta 1 > \alpha 1$) |
| $\beta 2 - \alpha 2$ | 40° ($\beta 2 > \alpha 2$) | 40° ($\beta 2 > \alpha 2$) |

$\alpha 1 = \alpha 2$.

The tests were carried out by the device shown in FIG. 2(a) under the test conditions of oil kind: paraffin series mineral oil, rod stroke: 50 mm, reciprocal vibration frequency: 1.2 Hz, pressure in chamber: 0 MPa (open to air) and temperature: 25° C.

Figure 5A:
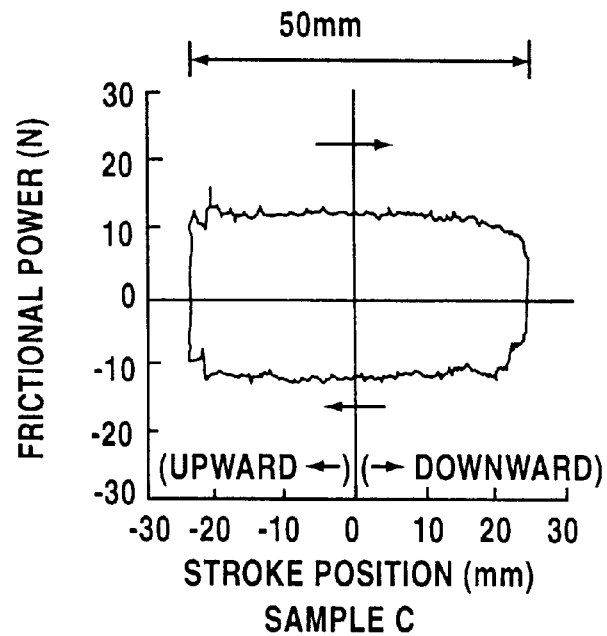
FIG. 5 is a view showing a result of an experimental test of the device shown in FIG. 4.
Figure 5B:
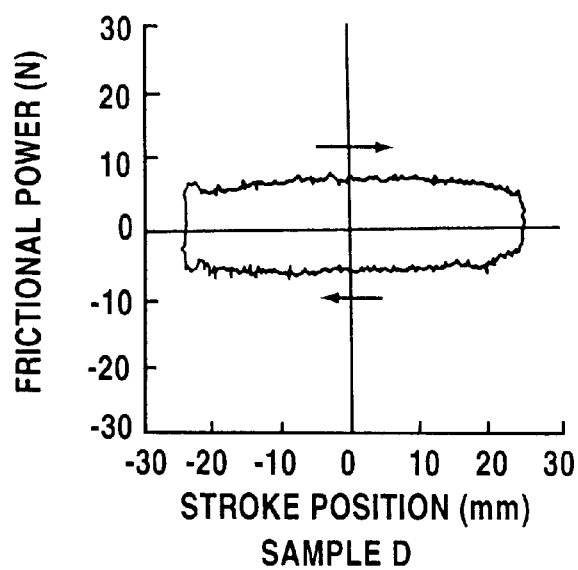

The obtained test results are shown in FIGS. 5(a) and 5(b) with the relationship between the stroke position and the friction force and in the Table 4 with one side average friction force at the stroke central position obtained by FIGS. 5(a) and 5(b).

In comparison with the sample C having the conventional shape with the sample D having the shape of the present invention, as shown in FIGS. 5(a) and 5(b), it will be understood that the friction force can be remarkably reduced in the sample of the present invention, and in view of the Table 4, the one side average friction force is reduced approximately half time.

TABLE 4

| Measuring | Sample | |
|---|---|---|
| Item | C | D |
| Average Friction Force (N) at Stroke Central Position | 12 (100%) | 6.5 (54%) |

(Fourth Embodiment)

Figure 6A:
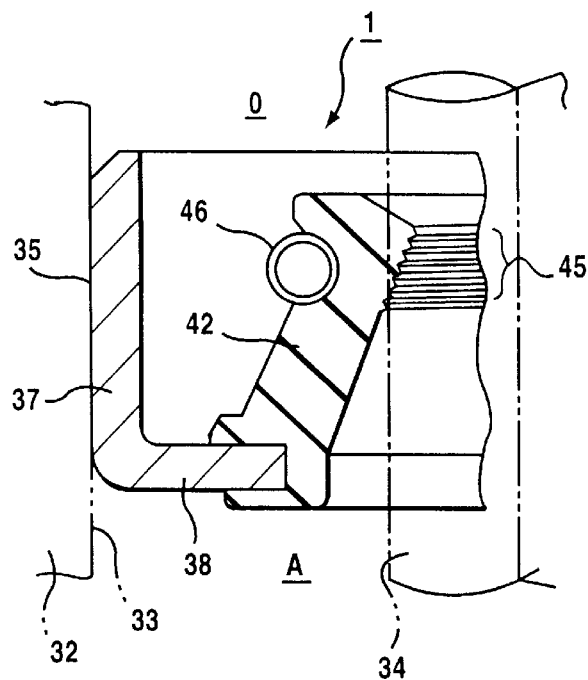
FIG. 6(a) is a sectional view of an essential portion thereof.
Figure 6B:
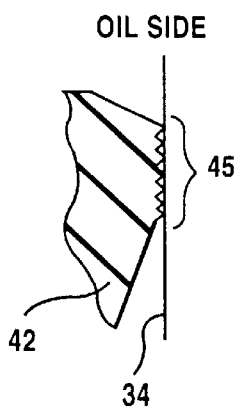
FIG. 6(b) is a view showing a contact condition of a seal lip and FIG. 6(c) is a view showing the contacting area between the shaft and the seal lip.

FIG. 6 represents a reciprocating sealing device according to the fourth embodiment of the present invention.

Figure 6C:
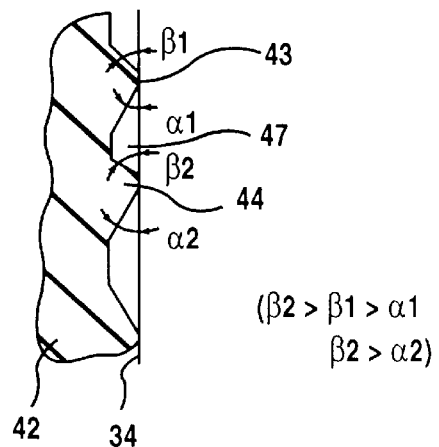

In the fourth embodiment, in an entire contacting area between the seal lip 42 and the shaft 34, as shown in FIG. 6(c), contact angles $\alpha 2$ and $\beta 2$ between the shaft 34 and a second stage projection 44 of a pair of projections nearest the oil side O are set to $\alpha 2 < \beta 2$ and contact angles $\alpha 1$ and $\beta 1$ between the shaft 34 and a first stage projection 43 are set to $\beta 2 > \beta 1 > \alpha 1$. These first and second stage projections 43 and 44 are formed as one set and a plurality sets 45 of these fine projections 43 and 44 are formed, each of these projections having a height of 5–50 µm. A spring member 46 is mounted to the back surface of the fine projection sets 45.

The other structures of the fourth embodiment are substantially the same as those of the third embodiment, so that like reference numerals are added to structural portions corresponding to those of the third embodiment and the explanations thereof are omitted herein.

In the reciprocating sealing device of the fourth embodiment, with the fine projection sets 45 each composed of one set of two stage projections 43 and 44 performing contact sliding with respect to the shaft 34, when the shaft 34 slides toward the atmosphere side A, the oil film formed by the second stage projection 44 is made thin in comparison with that of the first stage projection 43, and that is, the oil film is scraped off by the second stage projection 44, and oil flows into a bottom space 41 formed between the first and second stage projections 43 and 44 and is accumulated therein. The oil first flows in the bottom space 41 formed between a pair of two stage projections 43 and 44 nearest the oil side O and is then accumulated therein, and subsequently, the oil flow-in area in the space between the projections expands toward the atmosphere side A.

With the fine projection set of the conventional seal lip shown in FIG. 9(c), since the structure is not made so as to positively introduce the oil into a space between the projections, the lubrication is likely made insufficient in a contact sliding area, the friction force likely increases and the abrasion will be easily caused. Particularly, with respect to the projections in a contacting area on the atmosphere side, because the oil is obstructed by the projection near the oil side, the lubrication becomes insufficient and the abrasion will be likely caused. Further, in the case of increasing of the sealing pressure, since the oil film caused by the sliding motion is made thin, the abrasion of the projection will be accelerated.

On the other hand, with the fine projection sets 45 of the present invention, there is adopted a structure in which the oil is positively accumulated in the bottom space 47 between the projection sets each constituted by two stage projections 43 and 44. Accordingly, the first and second stage projections 43 and 44 surely contact the oil, thus improving the lubrication performance with low friction force and less abrasion.

(Fifth Embodiment)

Figure 7A:
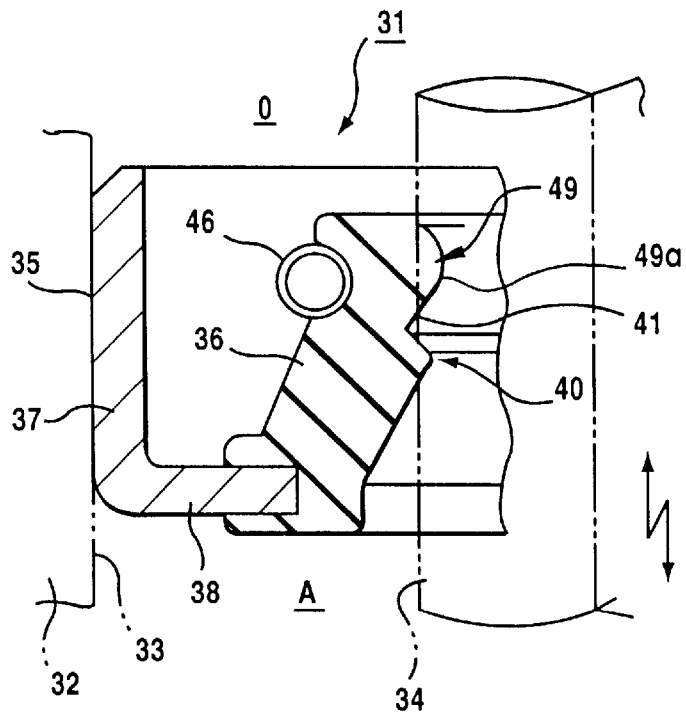
FIG. 7(a) is a sectional view of an essential portion thereof and FIG. 7(b) is a view showing a contact condition of a seal lip.
Figure 7B:
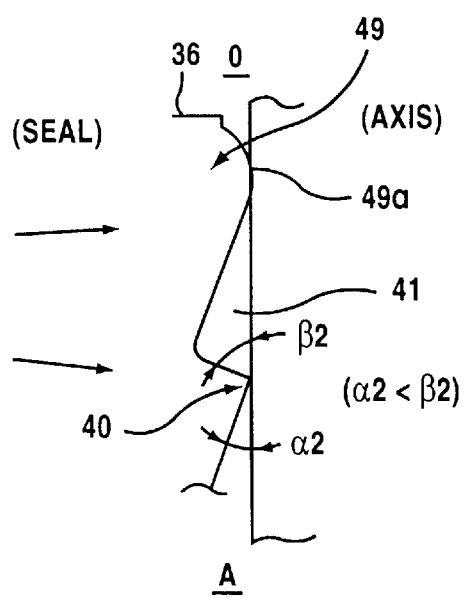

FIG. 7 represents the fifth embodiment according to the present invention.

As shown in FIG. 7, a free end of the projection 49 on the oil side is formed so as to provide a round shape 49a as a method for improving the lubrication performance of a pair of projections by positively introducing a fluid between the projections.

It is effective to set a curvature radius R of the round portion 49a to, for example, R>0.03 mm, preferably, R≧0.3 mm.

By providing the round shape 49a of the first stage projection 49, when the shaft 34 moves relatively toward the atmosphere side A, the film thickness on the first stage projection 49 is made larger than that on the second stage projection 40 by the round shape 49a, and hence, the oil flows into the bottom space 41 between the projections 49 and 40 and is accumulated therein. For this reason, the lubrication performance of the first and second stage projections 49 and 40 can be improved and the friction force is hence reduced.

The other structure and the function of the fifth embodiment are substantially the same as those of the third embodiment, and accordingly, like reference numerals are added to portions corresponding to those of the third embodiment and the explanation thereof is omitted herein.

(Sixth Embodiment)

FIG. 8 represents a reciprocating sealing device according to the sixth embodiment of the present invention.

This reciprocating sealing device is adapted to seal between two members disposed relatively slidably in an axial direction, one being a housing 2 and the other being a shaft 4 inserted into a shaft hole 3 of the housing 2, and a pair of first and second stage projections 69 and 70 are formed on a surface of a seal lip 66, supported integrally with a metal ring 65 as a sealing device body, contacting the shaft 4, with a predetermined space.

Each of the respective projections 69 and 70 has an axial cross section substantially in triangular shape having oblique surfaces of the projections 69 and 70 inclining from the free ends thereof toward the axial oil side O and atmosphere side A, and the contact angles are set by angles constituted between the oblique surfaces of the projections 69 and 70 on the oil side O and the atmosphere side A and the outer periphery of the shaft 4, respectively. These first and second stage projections 69 and 70 contact slidably the surface of the shaft 4 and a bottom space 71 is formed between the projections 69 and 70 and the outer peripheral surface of the shaft 4 so as to provides a triangular space in section.

Figure 8A:
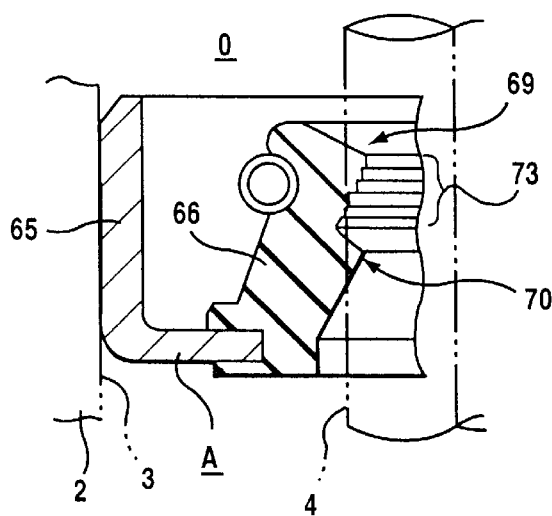
FIG. 8(a) is a sectional view of an essential portion thereof.
Figure 8B:
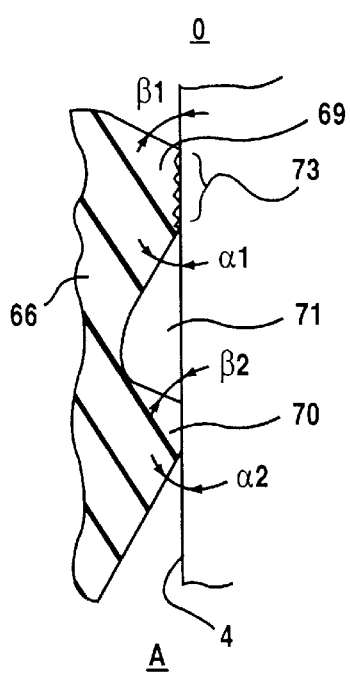
FIG. 8(b) is a view showing a contact condition of a seal lip.
Figure 8C:
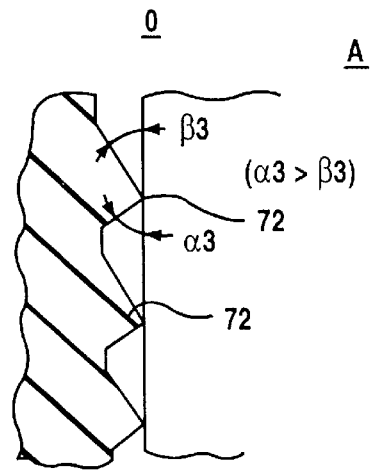
FIG. 8(c) is an enlarged view showing the contact condition of a projection set of the seal lip.

In this embodiment, as shown in FIG. 8(b), providing that a contact angle of the second stage projection 70 on the atmosphere side A is made as $\alpha 2$ and a contact angle thereof on the oil side O is made as $\beta 2$, the contact angle $\beta 2$ is set to be larger than the contact angle $\alpha 2$ ($\alpha 2 < \beta 2$), and providing that a contact angle of the first stage projection 69 on the oil side O is made as $\beta 1$ and a contact angle thereof on the atmosphere side A (space 71 side) is made as $\alpha 1$, the angular relationship is set to be $\alpha 1 < \beta 1$.

A projection set 73 composed of a plurality of fine projections 72 is formed on an atmosphere side surface (bottom space 71 side), as a surface of the projection 69 contacting the shaft 4, and providing that a contact angle of each of the fine projections 72 on the oil side O is set to $\beta 3$ and a contact angle thereof on the atmosphere side is set to α3, the angular relationship therebetween is set to β3<α3. The height of each fine projection 72 is set to a range of 5 to 50 μm. In order to achieve an effect of the setting of such contact angles, the height of the fine projection 72 may be approximately 1 μm and more than 50 μm.

In the present invention, according to the specific contact angles of the projection set 73 formed on the surface of the first stage projection 69 contacting the shaft 4, oil to be sealed is positively introduced into the bottom space 71 between the projections 69 and 70, thereby solving the oil insufficient problem, improving the lubrication performance of the paired projections 69 and 70, and reducing the friction force thereof. The oil sealing function is mainly performed by the second stage projection 70 on the atmosphere side A.

In the "pumping stroke" in which the shaft 4 relatively slides with respect to the seal lip 66 toward the atmosphere side A, with the first stage projection 69, a thick oil film is formed because the contact angle β3 on the oil side of the fine projections 72 of the projection set 73 is smaller than the contact angle α3 on the atmosphere side, i.e. β3<α3.

On the contrary, with the second stage projection 70, because the contact angle β2 on the oil side O is made larger than the contact angle α2 on the atmosphere side A, i.e. β2>α2, a thin oil film is formed, and an oil hardly leaks to the atmosphere side A, thus achieving an effective sealing function. That is, a fluid of an amount corresponding to the thickness of the oil film is accumulated in the bottom space 71 between the projections 69 and 70.

On the contrary, in the "motoring stroke" in which the shaft 4 moves toward the oil side O relatively with respect to the seal lip 66, with the first stage projection 69, the contact angles α3 and β3 of the fine projection 72 formed on the surface contacting the shaft 4 is set to β3<α3, so that the oil accumulated in the bottom space 71 merely forms a thin oil film, and hence, an oil of small amount returns to the oil side O.

That is, due to the repeated reciprocal motions, the oil is surely accumulated in the bottom space 71.

The oil flowing into the bottom space 71 and accumulated therein improves the lubrication performance on the atmosphere side A (bottom space 71 side) of the first stage projection 69 and the oil side O (bottom space 71 side) of the second stage projection 70 with respect to a conventional product.

That is, by setting the contact angles of the fine projection 72 formed to the surface of the first stage projection 69 contacting the shaft 4 to β3<α3, in the case of "pumping stroke", a thick oil film is formed on the fine projection 72 of the first stage projection 69, and at the second stage projection 70, the friction force is reduced by the improvement of the lubrication performance due to sufficient amount of the oil accumulated in the bottom space 71.

On the contrary, in the case of "motoring stroke", according to the improvement of the lubrication performance due to the sufficient amount of the oil accumulated in the bottom space 71, the friction force of the fine projection set 73 can be reduced.

Figure 8D:
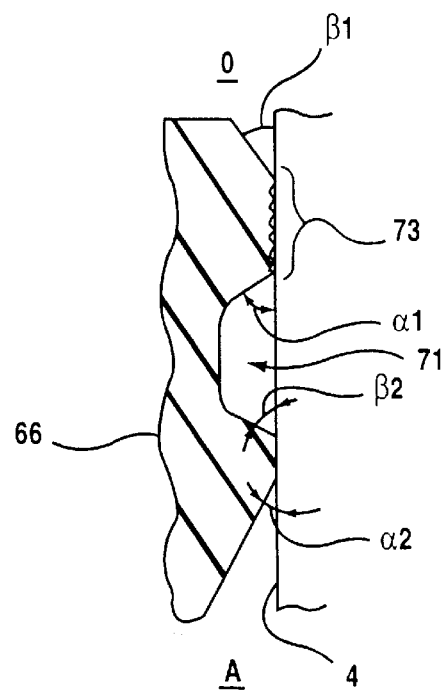
FIG. 8(d) is another view showing a contact condition of a seal lip.

The fine projection set 73 provided for the first stage projection 69 is formed to the surface thereof contacting the shaft 4, and in the case of the contact angle β1 on the oil side O and the contact angle α1 on the atmosphere side A, these contact angles are set to β1 >α1. In such case, the fine projection set 73 is formed on the surface of the first stage projection 69 on the atmosphere side A. In the case where these contact angles are set to β1<α1, as shown in FIG. 8(d), the fine projection set 73 is formed on the oil side surface of the first stage projection 69.

The relationship in largeness between the contact angles α1 and α1 of the first stage projection 69 has no relation to the function of the fine projection set 73, and in either one of the above cases, the effect of the fluid accumulation in the bottom space 71 can be achieved by the fine projection set 73.

Further, in the above embodiments, the examples were explained in the case of the seal lip contacting the shaft. However, the present invention is applicable to a case where the sealing device body is fixed to the shaft and a seal lip contacts the inner periphery of the housing as an outer seal.

Furthermore, in the above embodiments, examples of so-called oil seals were explained. However, the present invention is not limited to such examples and is applicable to many cases of reciprocating sealing devices provided with seal lips, like molding packing such as U-packing.

Still furthermore, a fluid to be sealed is not limited to an oil, and the present invention is usable for the sealing of water, various fluids such as chemicals or gas. In addition, an opposed sealing objective fluid to be sealed is not limited to be opened to air and various gases may be adapted.

Industrial Usage

As described hereinbefore, according to the present invention, it is useful for a reciprocating sealing device, and particularly, it is suitably applicable to reduce friction force and abrasion by positively introducing and accumulating a fluid, such as oil, into a space between the projections.

I claim:

1. A sealing device for sealing two relatively axially reciprocable members at an interface between a liquid and air comprising:

an annular body fixed to one of said members and having a seal lip extending from said body and slidably contacting the other of said members, a pair of annular projections formed in axially spaced relation on a surface of said seal lip, said projections each having a free end slidably contacting a sliding surface of said other member and thereby forming an annular space between said projections and said sliding surface of said other member, said free end of said projection on an air side of said sealing device having a contact structure defined by convergent surfaces so disposed with respect to said sliding surface of said other member as to define a surface facing a space between said projections inclined at an angle β2 with respect to said sliding surface of said other member and a surface facing oppositely from said space-facing surface at an angle α2 with respect to said sliding surface of said other member, said surfaces satisfying the relationship β2>α2, and said free end of said projection on a liquid side of said sealing device having a contact structure defined by convergent surfaces so disposed with respect to said sliding surface of said other member that, when said other member is moved in a direction from said liquid side to said air side, a thickness of a liquid film formed between said projection on the liquid side and said sliding surface of said other member is made greater than a thickness of liquid film formed between the projection on said air side and said sliding surface of said other member.

2. A reciprocating sealing device according to claim 1 wherein the convergent surfaces of the contact structure of the projection on the liquid side of said device are disposed with respect to the sliding surface of said other member to satisfy the relationship to β1<α1 wherein said convergent surfaces include a surface facing said space between said projections inclined at one angle $\alpha 1$ with respect to said sliding surface of said other member and a surface facing oppositely from said space-facing surface at an angle $\beta 1$ with respect to said sliding surface of said other member.

3. A reciprocating sealing device according to claim 1, wherein the contact structure of the projection on the liquid side of said device with respect to the sliding surface of said other member is set to $\beta 2 > \beta 1 > \alpha 1$ in a case where an angle of convergence of the surface of the projection on the liquid side with respect to said sliding surface of said other member is set to $\beta 1$ and an angle of convergence of the surface on the space-facing side of the projection with respect to sliding surface of said other member is set to $\alpha 1$.

4. A reciprocating sealing device according to claim 1, wherein the contact structure of the projection on the liquid side of said device with respect to the sliding surface of said other member is formed with an arcuate sectional shape in the axial direction.

5. A reciprocating sealing device according to claim 1, wherein a surface of the projection on the liquid side of said device contacting the sliding surface of said other member contains a plurality of fine axially spaced projections defined by convergent surfaces having a space therebetween and wherein said convergent surfaces include a space-facing surface inclined at an angle $\alpha 3$ with respect to said sliding surface of said other member and an oppositely-facing surface inclined at an angle $\beta 3$ with respect to said sliding surface of said other member, and the inclination of said surfaces satisfies the relationship $\beta 3 < \alpha 3$.

6. A reciprocating sealing device according to claim 1, including a plurality of pairs of projections disposed in the axial direction of said body.

7. A reciprocating sealing device according to claim 2, wherein angles of said pair of projections of the seal lip are set to $\beta 2 \geq \alpha 1$ under a condition in which $\alpha 1 \geq \beta 1$ and $\alpha 2 \leq \beta 2$.

8. A reciprocating sealing device according to claims 5 or 6, wherein the fine projections have a minimum height of 1 $\mu$m.

9. A reciprocating sealing device according to claim 6, wherein said seal lip includes a lip sliding surface on which said plurality of pairs of projections are formed, said lip sliding surface being an inclining surface apart from the sliding surface of said other member from the liquid side of said device toward the air side thereof and the free end of the lip sliding surface containing a flat surface portion having a predetermined width.

10. A reciprocating sealing device according to any one of claims 1, 2 or 3, wherein a sectional shape of each projection in the axial direction is substantially triangular such that oblique surfaces of the projection extending from the free end thereof toward the liquid side and the air side, respectively, are inclined in the axial direction to form the space between said projections.

11. A reciprocating sealing device according to claim 4, wherein the arcuate shape has a radius of curvature in section set to a value more than about 3/100 mm.

* * * * *